United States Patent [19]

Motoyama et al.

[11] Patent Number: 4,628,390
[45] Date of Patent: Dec. 9, 1986

[54] FOOT SWITCH APPARATUS FOR A TRANSCRIBER

[75] Inventors: Kazuyasu Motoyama; Katsumi Kanayama, both of Tokyo, Japan

[73] Assignee: Olympus Optical Co., Ltd., Tokyo, Japan

[21] Appl. No.: 582,150

[22] Filed: Feb. 24, 1984

Related U.S. Application Data

[63] Continuation of Ser. No. 322,230, Nov. 17, 1981, abandoned.

[30] Foreign Application Priority Data

Nov. 26, 1980 [JP] Japan .......................... 55-169363[U]

[51] Int. Cl.⁴ ...................... G11B 19/08; G11B 19/00
[52] U.S. Cl. .................................. 360/137; 360/74.1; 369/25; 339/12 V
[58] Field of Search ...................... 360/137, 69, 71, 73, 360/90, 74.1, 74.2, 60; 369/24, 25, 29; 339/12 V, 119 R, 119 C, 119 L, 103 R

[56] References Cited

U.S. PATENT DOCUMENTS

| | | | |
|---|---|---|---|
| 2,657,367 | 10/1953 | Brooks | 339/119 L |
| 3,049,688 | 8/1962 | Sinopoli | 339/12 V |
| 3,567,229 | 3/1971 | Ridings et al. | 360/74.1 |
| 3,758,726 | 9/1973 | Bolick, Jr. et al. | 369/24 |
| 3,838,383 | 9/1974 | Wilbur et al. | 339/103 R |
| 4,032,983 | 6/1977 | Sato | 360/69 |
| 4,121,060 | 10/1978 | Bohnhoff | 369/29 |
| 4,206,486 | 6/1980 | Satoh et al. | 360/73 |
| 4,225,890 | 9/1980 | Takenaka et al. | 360/71 |
| 4,328,397 | 5/1982 | Chamberlin | 369/25 |
| 4,340,917 | 7/1982 | Furuta | 360/74.2 |

FOREIGN PATENT DOCUMENTS

| | | | |
|---|---|---|---|
| 2149046 | 10/1971 | Fed. Rep. of Germany | 360/137 |
| 576759 | 4/1946 | United Kingdom | 174/175 |

Primary Examiner—Aristotelis M. Psitos
Assistant Examiner—Steven R. Garland
Attorney, Agent, or Firm—Frishauf & Partners

[57] ABSTRACT

Disclosed is a foot switch apparatus which is connected to a tape recorder, the tape recorder having a mode control circuit which designates its operation mode. The foot switch has an automatic back spacing circuit coupled to the mode control circuit. When the foot switch operates, a recording tape on the tape recorder is rewound by a predetermined length in response to an operation of the automatic back spacing circuit.

7 Claims, 16 Drawing Figures

FOOT SWITCH APPARATUS FOR A TRANSCRIBER

This application is a continuation, of application Ser. No. 322,230, filed Nov. 17, 1981, now abandoned.

BACKGROUND OF THE INVENTION

The present invention relates to a foot switch apparatus for a tape recorder, such as a transcriber, which includes an automatic back spacing circuit. An automatic back spacing circuit is assembled in a tape recorder such as a transcriber for dictation. For example, U.S. Pat. No. 3,567, 229 (issued Mar. 2, 1971) proposes such a tape recorder. When documents are typed while dictated sound is reproduced, the typist often misses the dictated contents. In this case, a cycle of operations of playback, stop, rewind and playback must be repeated in order to listen again to the missing part of the dictation, resulting in cumbersome operation. An automatic back spacing circuit is utilized for eliminating this inconvenience. A tape length corresponding to a few words is automatically rewound by the automatic back spacing circuit every time the playback mode is interrupted. The operation of a transcriber with an automatic back spacing function becomes easy when a foot switch is utilized. When a dictation playback operation is performed with a foot switch, the typist need not remove his/her fingers from the keys.

In a transcriber, an automatic back spacing circuit is often included for the reasons described above. Further, a foot switch is also used jointly with the transcriber. However, the automatic back spacing circuit requires a considerable space, preventing the transcriber from achieving a compact structure.

SUMMARY OF THE INVENTION

The object of the present invention is to provide a foot switch apparatus which eliminates an automatic back spacing circuit from a tape recorder unit such as a transcriber or the like.

In order to achieve the above and other objects, the present invention provides a foot switch apparatus which has an automatic back spacing circuit.

When a foot switch apparatus for a tape recorder, such as a transcriber, according to the present invention is arranged or combined with an electronically controlled (logic controlled type) tape recorder, this tape recorder functions as a transcriber with an automatic back spacing function. The automatic back spacing circuit is not required for a tape recorder per se if this tape recorder has the foot switch apparatus according to the present invention as an option. Therefore, this type of tape recorder can be manufactured to be small in size, light in weight, and low in cost, in contrast to a transcriber with the automatic back spacing function. When the tape recorder of this type is purchased, and a transcriber function is required later on, only a foot switch apparatus according to the present invention need be purchased. Therefore, a user need not purchase a transcriber and a foot switch in addition to a general portable tape recorder. For example, a dictator performs dictation with the compact tape recorder described above. The dictator gives both the recorded tape and the tape recorder to a typist who has the foot switch apparatus according to the present invention. The tape recorder functions as a transcriber having an automatic back spacing function when it is connected with a foot switch apparatus according to the present invention.

A foot switch apparatus according to the present invention may be used with a plurality of different types of tape recorders. For example, when a microcassette tape recorder A and a compact cassette tape recorder B have connectors (plug/receptacle) of the same specifications, the foot switch apparatus according to the present invention may be used for both of these tape recorders. The tape recorder A or B which is connected to the foot switch apparatus according to the present invention functions as a transcriber with the automatic back spacing function. If the connection specifications between the foot switch apparatus and the tape recorder are established to be the same, the foot switch apparatus according to the present invention may be used for various tape recorders.

DETAILED DESCRIPTION OF THE PREFERRED EMBODIMENTS

One embodiment of the present invention will be described with reference to the accompanying drawings. For all the drawings, the same reference numerals denote similar parts. The description of similar parts will not be repeated.

Figure 1:
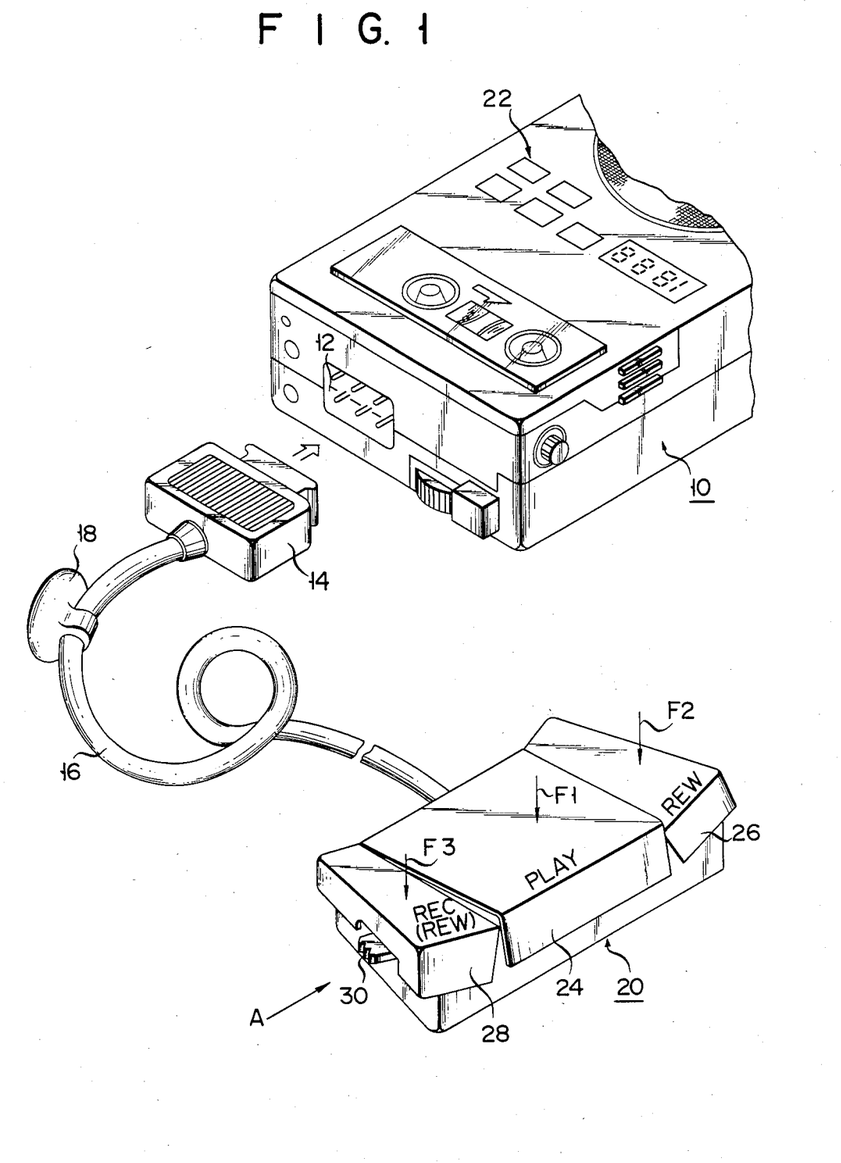
FIG. 1 is a perspective view of a foot switch apparatus according to one embodiment of the present invention.

FIG. 1 shows a foot switch apparatus according to the present invention. Referring to FIG. 1, a receptacle 12 of multiple pin type is disposed at a top side of a tape recorder or a transcriber (recording unit) 10. A plug 14 may be detachably mounted to the receptacle 12. The plug 14 is connected to a foot switch 20 through a cable 16. A suction cup 18 which is made of an elastic material such as rubber is mounted to the cable 16. The suction cup 18 is attached and fixed to the upper surface of a table (not shown) on which the tape recorder 10 is placed. Thereupon, even if the foot of the typist erroneously catches the cable 16, the tape recorder 10 will not fall from the table to the floor.

The tape recorder 10 may be used independently of the foot switch 20 when the tape recorder 10 is disconnected from the foot switch 20. In this manner, the tape recorder 10 need not be manufactured specifically for a transcriber. The operation of the tape recorder 10 is controlled by depressing buttons which constitute a keyboard 22. When the plug 14 is inserted in the receptacle 12, the operation of the tape recorder 10 is controlled with the foot switch 20. For example, when a playback pedal 24 is depressed by the foot, a playback switch S24 (not shown) which cooperates with the playback pedal 24 is turned on and the tape recorder 10 performs reproduction. When a foot pressure F1 is removed from the playback pedal 24, the playback switch S24 is turned off. Simultaneously, a tape length corresponding to a few words is automatically rewound by the automatic back spacing operation. When the playback pedal 24 is depressed again, tape playback is initiated at a position to which the tape has been automatically rewound by the automatic back spacing operation. The tape is continuously rewound when a rewind pedal 26 is continuously depressed. Further, recording on the tape is performed while a recording pedal 28 is continuously depressed.

A mode change switch 30 is arranged on the side surface of the foot switch 20 on which the recording pedal 28 is mounted. The mode change switch 30 is used for preventing erroneous erasure of the tape when the recording pedal 28 is erroneously depressed in the playback mode by the typist. When the mode change switch 30 is set in advance to the recording mode prohibiting side, the recording mode is prohibited even if a foot pressure F3 is applied to the recording pedal 28. Furthermore, even when the rewind pedal 26 and the recording pedal 28 are depressed together, the automatic back spacing operation is not initiated.

Figure 2:
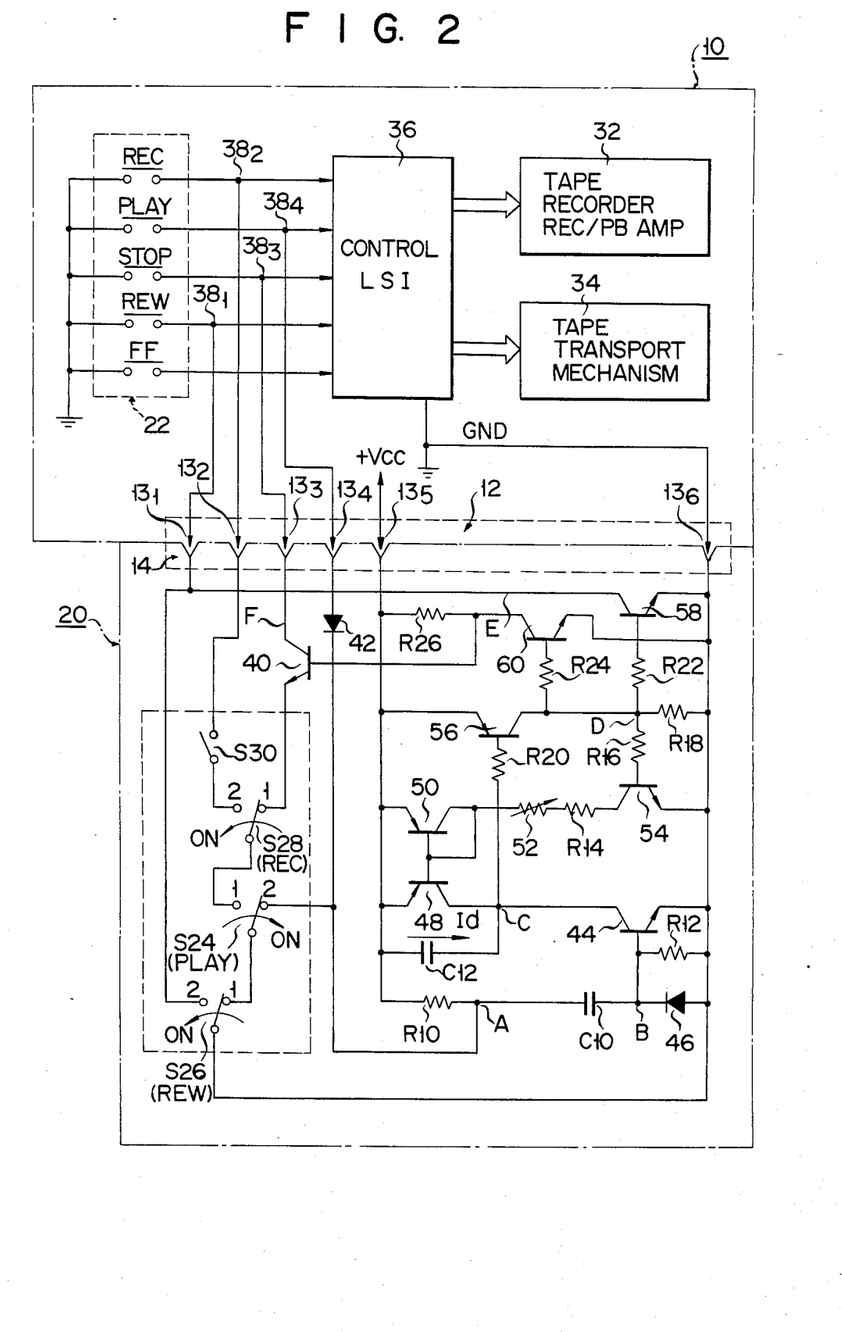
FIG. 2 is a circuit diagram for illustrating an internal arrangement of a tape recorder and the foot switch of FIG. 1.

FIG. 2 shows an internal arrangement of the tape recorder 10 and the foot switch 20 of FIG. 1. The modes of operation of a recording/playback amplifier 32 and a tape transport mechanism 34 of the tape recorder 10 are determined by a control LSI (mode control circuit) 36. Controlling conditions of the control LSI 36 are changed with the operation of five switches which constitute the keyboard 22. The modes of operation of the tape recorder 10, such as recording (REC), playback (PLAY), stop (STOP), rewind (REW) and fast forward (FF) modes, are determined with the operation of the keyboard 22. Since the recording/playback amplifier 32, the tape transport mechanism 34 and the control LSI 36 may be constructed by a known method, the description thereof will be omitted. However, refer to Japanese Utility Model Application No. 54-106,679 for details of the tape recorder 10. A commercially available IC for mechanism control (for example, HA12001W manufactured by Hitachi Works, Ltd., Japan) or equivalent may be used as the control LSI 36.

When the foot switch 20 is connected to the tape recorder 10 through the receptacle 12 and the plug 14, the operating mode of the tape recorder 10 is controlled by the operation of the foot switch 20. For example, when the rewind pedal 26 shown in FIG. 1 is depressed, a rewind switch S26 is turned on. An input end $38_1$ of the control LSI 36 is grounded through an electrical contact $13_1$, a second contact of the rewind switch 26, and an electrical contact $13_6$. This mode of operation is the same as the operation in which a rewind button (REW) of the keyboard 22 is depressed so that the tape recorder 10 is set in the rewind mode. When the foot pressure is released from the rewind pedal 26, the rewind switch S26 is turned off. In this condition, if the playback pedal 24 and the recording pedal 28 are not depressed, the rewind switch S26, the playback switch S24 and a recording switch S28 are set at first contacts. An input end $38_3$ of the control LSI 36 is grounded through an electrical contact $13_3$, an npn transistor 40, the first contact of the recording switch S28, the first contact of the playback switch S24, the first contact of the rewind switch S26, and the electrical contact $13_6$. (In this condition, the npn transistor 40 is kept conductive.) This mode of operation is the same as the operation in which a stop button (STOP) of the keyboard 22 is depressed so that the tape recorder 10 is set in the stop mode.

Similarly, when the recording pedal 28 is depressed while the playback pedal 24 and the rewind pedal 26 are not depressed, a second contact of the recording switch S28 is grounded through the first contact of the playback switch S24, the first contact of the rewind switch S26 and the electrical contact $13_6$. In this condition, if a recording mode prohibiting switch S30 is turned on, an input end $38_2$ of the control LSI 36, which is coupled to an electrical contact $13_2$, is grounded. When the recording pedal 28 is depressed, the tape recorder 10 is set in the recording mode. When the foot pressure is released from the recording pedal 28, the input end $38_3$ is grounded so that the tape recorder 10 is set in the stop mode. When the recording mode prohibiting switch S30 is turned off, the input end $38_2$ is not grounded even if the recording pedal 28 is depressed. The recording mode prohibiting switch S30 prohibits the recording mode which may be established by the pedal operation of the foot switch 20.

When the playback pedal 24 is depressed, an input end $38_4$ of the control LSI 36 is grounded through an electrical contact $13_4$, a diode 42, the second contact of the playback switch S24, the first contact of the rewind switch S26 and the electrical contact $13_6$. Therefore, the tape recorder 10 is set in the playback mode. At the same time, a node A between one end of a resistor R10 and one end of a capacitor C10 is grounded through the second contact of the playback switch S24 and the first contact of the rewind switch S26. The other end of the resistor R10 is connected to a power source voltage +Vcc through an electrical contact $13_5$. The other end of the capacitor C10 is connected to the base (node B) of an npn transistor 44. The cathode and anode of a diode 46 are, respectively, connected to the base and emitter of the npn transistor 44. A resistor R12 is connected parallel with the diode 46. The emitter of the npn transistor 44 is grounded and the collector thereof is connected to the collector (node C) of a pnp transistor 48.

A capacitor C12 is connected in parallel with the collector-emitter path of the pnp transistor 48. The base of the pnp transistor 48 is connected to the base of a pnp transistor 50 to form a current mirror circuit. The emitters of the pnp transistors 48 and 50 are connected to the power source voltage +Vcc. The base and collector of the pnp transistor 50 are commonly connected to the collector of an npn transistor 54 through a variable resistor 52 and a resistor R14. The emitter of the npn transistor 54 is grounded. The base of the npn transistor 54 is grounded through resistors R16 and R18. A node D between the resistors R16 and R18 is connected to the collector of a pnp transistor 56. The base of the pnp transistor 56 is connected to the collector of the pnp transistor 48 through a resistor R20, and the emitter of the pnp transistor 56 is connected to the power source voltage +Vcc.

The collector of the pnp transistor 56 is connected to the base of an npn transistor 58 through a resistor R22, and to the base of an npn transistor 60 through a resistor R24. The emitter of the npn transistor 58 is grounded and collector (node E) thereof is connected to the electrical contact 13₁. The emitter of the npn transistor 60 is grounded and the collector thereof is connected to the power source voltage +Vcc through a resistor R26. The base of the npn transistor 40 is connected to the collector of the npn transistor 60. The collector (node F) of the npn transistor 40 is connected to the electrical contact 13₃.

The constituting elements, that is, the transistors 40 to 60, the resistors R10 to R26, and the capacitors C10 and C12 form the automatic back spacing circuit which is connected to the control LSI (mode control circuit) 36.

Figure 3:
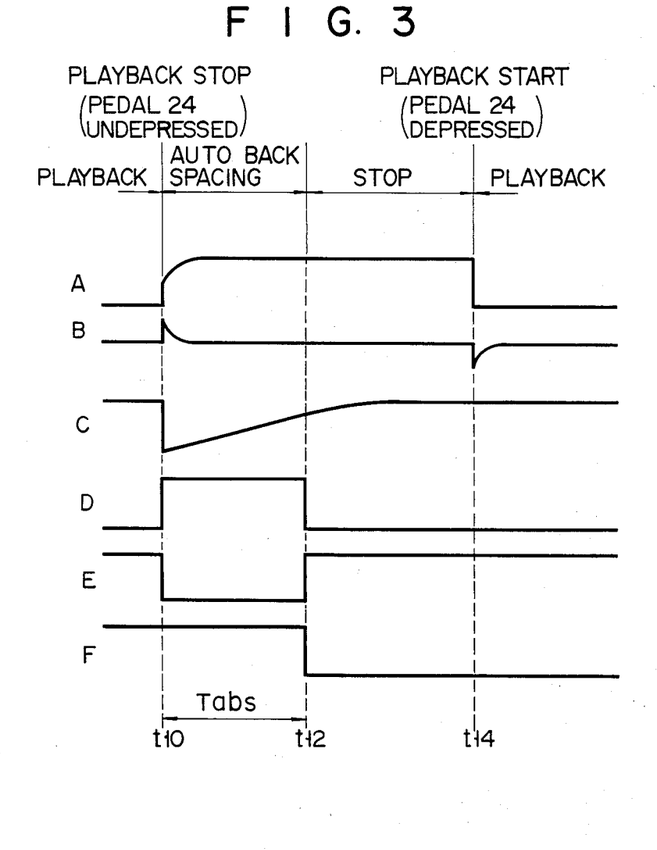
FIGS. 3a-3f are shows timing charts for explaining the mode of operation of the circuit of FIG. 2.

FIG. 3 shows waveforms at the nodes A to F of the automatic back spacing circuit of FIG. 2. Before a time t10, a case is shown in which the playback in the tape recorder 10 is initiated as the playback pedal 24 shown in FIG. 1 is depressed. Assume that the typist releases his or her foot from the playback pedal 24 at the time t10 in order to replay a certain dictated part. The grounding condition of the node A by the playback switch S24 and the rewind switch S26 is released immediately after the time t10. When this occurs, the capacitor C10 is charged by the power source voltage +Vcc through the resistor R10, so that the npn transistor 44 is rendered conductive for a short period of time. Referring to FIG. 3, the voltage waveforms at the nodes A and B at this moment are shown. When the npn transistor 44 is turned on, the capacitor C12 is charged. The potential at the node C temporarily decreases as shown in FIG. 3. The duration in which the npn transistor 44 is turned on depends on a time constant R10×C10. That is to say, the values of the resistor R10 and the capacitor C10 are determined to establish a time constant necessary for charging the capacitor C12.

When the capacitor C12 is charged after the time t10, the pnp transistor 56 is turned on. The potential at the node D becomes high level ($\approx$+Vcc). When the node D is set at high level, the npn transistors 54, 58 and 60 are rendered conductive. When the npn transistor 58 is turned on, the potential at the node E becomes low level so that the rewind mode is set. When the base of the npn transistor 40 is set at low level by the on state of the npn transistor 60, the npn transistor 40 is kept nonconductive even if the playback switch S24 is set at the first contact. Therefore, the potential at the node F is kept at high level after the time t10. In other words, the control LSI 36 is not set at the stop mode.

A collector current of the npn transistor 54 in the on state flows to the current mirror circuit which is constituted by the pnp transistors 48 and 50. A discharge current Id flows through the emitter-collector path of the pnp transistor 48. The intensity of the discharge current Id is substantially the same as the collector current of the npn transistor 54. The capacitor C12 is discharged at a constant current by the discharge current Id, so that the potential at the node C gradually increases after the time t10 as shown in FIG. 3. The intensity of the collector current (ON current) of the npn transistor 54 may be changed with the variable resistor 52. In the same manner, the intensity of the discharge current Id for the capacitor C12 may also be changed with the variable resistor 52. As a result, the potential gradient at the node C is adjusted with the variable resistor 52.

When the capacitor C12 continues to discharge by the discharge current Id, assume that the potential at the node C increases until the pnp transistor 56 is turned off at a time t12. When the pnp transistor 56 is turned off, the potential at the node D decreases to zero, so that the npn transistors 54, 58 and 60 are all turned off. When the npn transistor 54 is turned off, the capacitor C12 stops discharging. When the npn transistor 60 is turned off, the base potential of the npn transistor 40 becomes high level so that the npn transistor 40 is turned on. The electrical contact 13₃ is grounded through the npn transistor 40, the first contact of the recording switch S28, the first contact of the playback switch S24, and the first contact of the rewind switch S26. Therefore, the potential at the node F becomes low level so that the stop mode is set. When the npn transistor 58 is turned off, the potential at the node E becomes high level so that the rewind mode is cancelled.

A period Tabs between the time t10 and the time t12 of FIG. 3 is the period for the automatic back spacing operation. Within this period, the tape recorder 10 performs the operation for automatically rewinding a tape by a length corresponding to a few words. As described above, the gradient of the potential increase at the node C may be adjusted by the variable resistor 52. Therefore, the automatic back spacing period Tabs may arbitrarily be adjusted by the variable resistor 52. Although a knob of the variable resistor 52 is not shown, the knob may be disposed at a proper position on the foot switch 20 or the plug 14. As long as the tape recorder 10 and/or the dictation tape is not changed, the automatic back spacing period Tabs need not be readjusted once the period is set. For this reason, even if the knob of the variable resistor 52 is disposed at the foot switch 20, this does not result in inconvenience.

When the playback pedal 24 is depressed at a time t14, the same tape playback operation as at the time t10 is repeated. When the playback pedal 24 is depressed and the playback switch S24 is set at the second contact, the diode 46 is arranged so as to perform discharging of the capacitor C10 through the path of S24, S26, 46 and C10. When a playback button (PLAY) of the keyboard 22 of the tape recorder 10 is depressed, the diode 42 is arranged so as to prevent the automatic back spacing operation.

The relation among the automatic back spacing period Tabs, the capacitor C12, the variable resistor 52 and the resistor R14 will be described. A saturation voltage $V_{CE}$(SAT) between the collectors and emitters of each of the npn transistor 54 and the npn transistor 44 is sufficiently low as to be negligible. The threshold voltage between the bases and emitters of the pnp transistors 50 and 56 is defined as $V_{BE}$ ($\approx$0.6 V at room temperature) and a base current IB of the pnp transistor 56 is sufficiently small as to be negligible.

When the npn transistor 44 is turned on at the time t10 of FIG. 3, the charge voltage of the capacitor C12 becomes substantially the same as the power source voltage +Vcc. On the other hand, the discharge current Id flowing through the capacitor C12 during the period between the time t10 and the time t12 is given by the following relation $$Id \approx (Vcc - V_{BE})/(R52 + R14) \qquad (1)$$

where R52 is the resistance of the variable resistor 52. The capacitor C12 which is charged with the power source voltage +Vcc is discharged at a constant rate by the discharge current Id. When the charge voltage of the capacitor C12 drops to the threshold voltage $V_{BE}$, that is, when the potential at the node C increases to $Vcc-V_{BE}$, the pnp transistor 56 is turned off. Therefore, the period for which the pnp transistor 56 is turned on, that is, the automatic back spacing period Tabs, corresponds to a period for which the charge voltage of the capacitor C12 drops from the power source voltage +Vcc to the threshold voltage $V_{BE}$. Since the capacitor C12 discharges with the constant discharge current Id, the automatic back spacing period Tabs is given by the following relation $$Tabs \approx (Vcc - V_{BE}) \cdot C12 \cdot Id \qquad (2)$$

When relation (1) is substituted into relation (2), the following relation is obtained.

$$Tabs \approx (R52 + R14) \cdot C12 \qquad (3)$$

Relation (3) indicates that the automatic back spacing period Tabs varies in accordance with the resistance R52 of the variable resistor 52.

Figure 4:
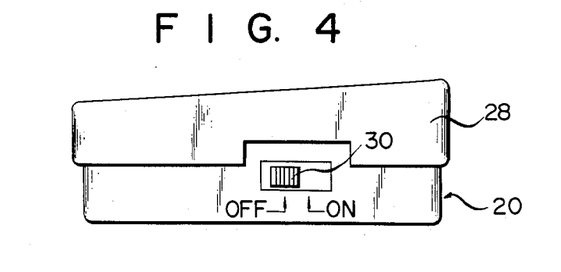
FIG. 4 is a side view of the foot switch from the direction indicated by arrow A in FIG. 1.

FIG. 4 shows the foot switch 20 as viewed from the direction indicated by arrow A in FIG. 1. When the mode change switch 30 is set at the on state, recording may be performed by depressing the recording pedal 28. On the other hand, when the mode change switch 30 is set at the off state, the switch S30 shown in FIG. 2 is turned off so that recording is not performed even if the recording pedal 28 is depressed.

Figure 5:
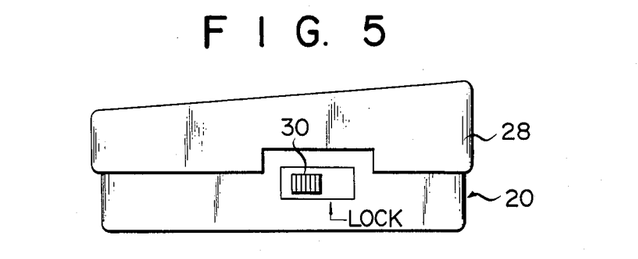
FIG. 5 is a side view of a modification of the foot switch shown in FIG. 4.
Figure 6:
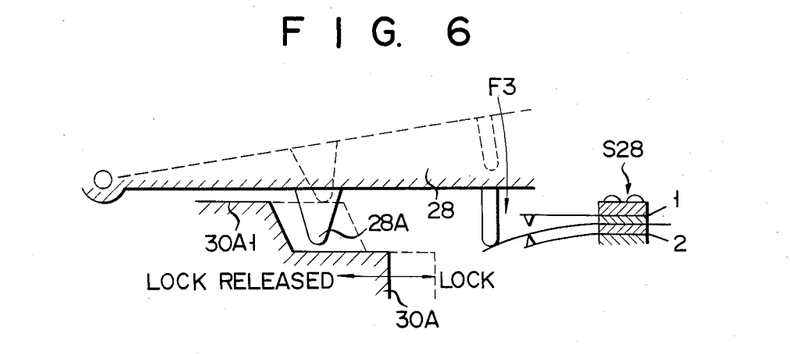
FIG. 6 is a view for explaining the main part of the internal arrangement of FIG. 5.

FIG. 5 shows a modification of FIG. 4. Referring to FIG. 4, erroneous recording is prevented with the knob operation of the mode change switch 30 connected to the recording mode prohibiting switch S30 of FIG. 2. On the other hand, referring to FIG. 5, a locking mechanism is used in order to prevent the recording switch S28 from being set to the on state so that erroneous recording is prevented. FIG. 6 shows one example of the locking mechanism. When the mode change switch S30 is not set in the locking position, the recording switch S28 is set from the first contact position to the second contact position when the recording pedal 28 is depressed. However, when the mode change switch 30 is set in the locking position, a slider member 30A moves to the right. As shown by the broken line, a projection 28A which is disposed on the inner wall of the recording pedal 28 bumps against an upper surface 30A1 of the slider member 30A so that the recording switch is not set to the on position even if the recording pedal 28 is depressed. Therefore, erroneous recording is prevented by setting the knob of the mode change switch 30 to the locking position.

Figure 7:
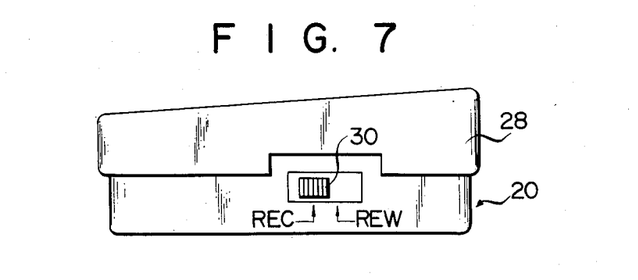
FIG. 7 is a side view of another modification of the foot switch in FIG. 4.
Figure 8:
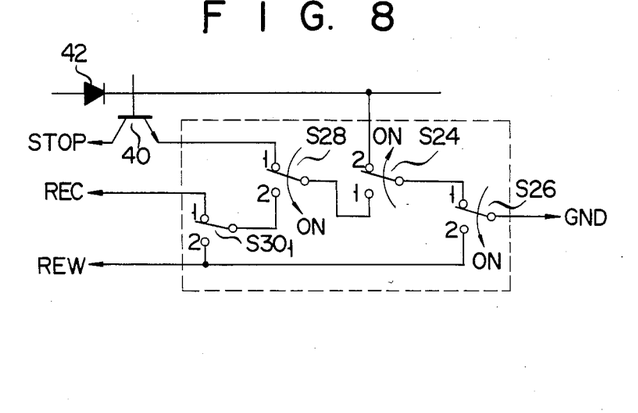
FIG. 8 is a circuit diagram which corresponds to the modification of FIG. 7.

FIG. 7 shows another modification of FIG. 4. Referring to FIG. 7, the mode change switch 30 is used not only used for preventing erroneous recording, but for switching the operating mode by the recording pedal 28. FIG. 8 is a circuit diagram corresponding to the modification of FIG. 7. When the mode change switch 30 is switched from the REC side to the REW side, a mode change switch S301 cooperating with the knob of the mode change switch 30 is switched from a first contact position to a second contact position. In this case, when the recording pedal 28 is depressed, a REW line is connected to a GND line so that the tape recorder 10 is set in the rewind mode. When the foot pressure is released from the recording pedal 28, the recording switch S28 is set to the first contact position. A STOP line is connected to the GND line through the npn transistor 40, the recording switch S28, the playback switch S24 and the rewind switch S26, so that the tape recorder 10 is set in the stop mode.

Figure 9:
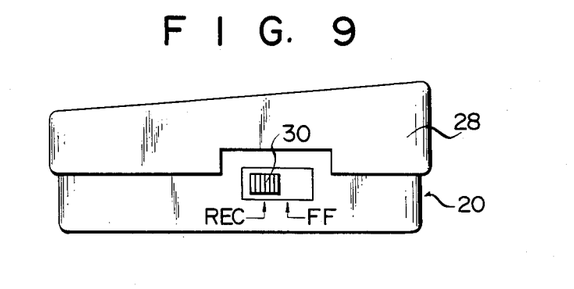
FIG. 9 is a side view of still another modification of FIG. 7.
Figure 10:
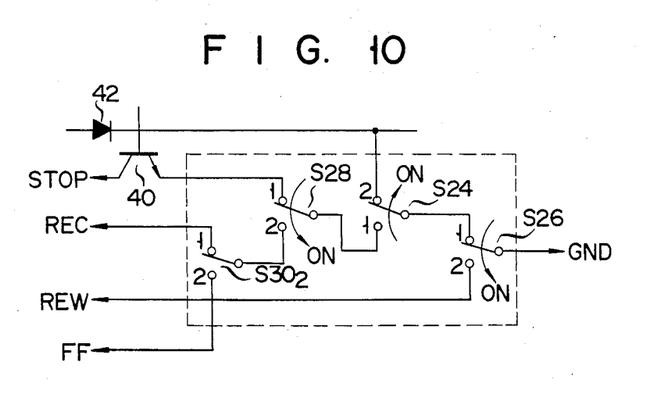
FIG. 10 is a circuit diagram which corresponds to the modification of FIG. 9.

FIG. 9 shows a modification of FIG. 7 and FIG. 10 is a circuit diagram corresponding to the modification of FIG. 9. Referring to FIG. 7, the recording pedal 28 is used for recording and rewinding (REC/REW). However, referring to FIG. 9, the recording pedal 28 is used for recording and fast forwarding (REC/FF). That is, when the mode change switch 30 is set from the REC position to the FF position, the mode change switch S302 of FIG. 10 is set from a first contact position to a second contact position. The second contact of the mode change switch S302 is connected to an FF input end of the control LSI 36 of FIG. 2 through a seventh electrical contact (not shown) of the plug 14/receptacle 12 and an FF line. Therefore, when the mode change switch S302 selects the second contact, the FF line is grounded through the mode change switch S302, the recording switch S28, the playback switch S24 and the rewind switch 26 when the recording pedal 28 is depressed. Therefore, the tape recorder 10 is set in the FF mode. When the foot pressure is released from the recording pedal 28, the STOP line is grounded through the npn transistor 40, the recording switch S28, the playback switch S24 and the rewind switch S26, so that the tape recorder 10 is set in the stop mode.

Figure 11:
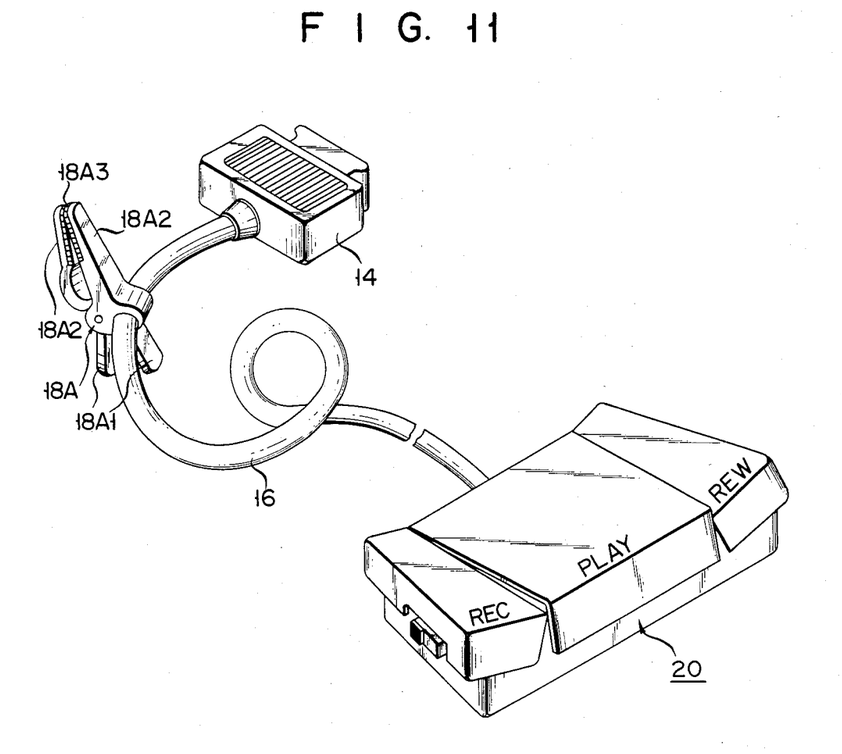
FIG. 11 is a perspective view of a modification of FIG. 1.

FIG. 11 shows a modification of FIG. 1. Referring to FIG. 1, the cable 16 is fixed to the table with the suction cup 18. Contrarily, in FIG. 11, the cable 16 is fixed to the table with a clip 18A. When knob portions 18A1 of the clip 18A are gripped firmly, a pair of clamping portions 18A2 opens. Rubber plates 18A3 are adhered to the inner surfaces of the clamping portions 18A2. These clamping portions 18A2 clamp a projection at the side of the table or a handle of a drawer of the table. Even if a foot catches the cable 16, the tape recorder (not shown) which is connected to the plug 14 will not fall from the table.

The present invention is not limited to the particular embodiment described herein and illustrated in the accompanying drawings. Various changes and modifications may be provided within the spirit and scope of the present invention and the appended claims. For example, referring to FIG. 1, a three pedal type foot switch 20 is shown. However, the number of pedals may vary. A plurality of cable fixing units such as the suction cup 18 may be used. The automatic back spacing circuit shown in FIG. 2 may be arranged with one-shot multivibrators or the like. Arrangements disclosed in (i) U.S. Ser. No. 145,735 "Back Spacing Apparatus" filed on May 1, 1980 (now U.S. Pat. No. 4,340,917 issued July 20, 1982) and application (ii) corresponds to U.S. Ser. No. 148,500 "Back Spacing Apparatus for a Transcribing Machine: filed on May 9, 1980 (now U.S. Pat. No. 4,331,308 issued May 25, 1982) may be employed with the present invention. Furthermore, a mechanism disclosed in U.S. Pat. No. 4,079,900 Mar. 21, 1978) may be used for a driving system of miniature dictating machines:

What we claims is:

1. A foot switch apparatus for an electronically controlled tape recorder which does not per se include an automatic back space operation mode, said tape recorder having a mode control circuit which controls playback, stop, recording and rewind operation modes of the tape recorder, and mode selecting means for selecting one of the operation modes including the playback mode, said foot switch apparatus being external of the tape recorder and comprising:

switching means adapted to be coupled to the mode control circuit of the tape recorder, for specifying at least a playback mode and a stop mode of the tape recorder in response to a foot pressure applied selectively on the foot switch apparatus;

said switching means includes a playback switch for switching a playback signal to be applied to the mode control circuit, said playback switch specifying said playback mode when switching said playback signal on and specifying said stop mode after switching said playback signal off;

a recording switch adapted to be coupled to said mode control circuit and coupled to said playback switch and which designates said recording mode for said mode control circuit when said playback switch designates said stop mode, and prohibiting means coupled to said recording switch for prohibiting erroneous designation of said recording mode when recording is not to be performed;

back spacing means coupled to said switching means, for actuating the rewind mode of the mode control circuit for a predetermined period of time in response to switching off said playback signal by said playback switch, and for effecting the stop mode after said predetermined period;

said back spacing means including:

first circuit means coupled to said playback switch for generating a first signal having a duration of time corresponding to the predetermined period of said rewind mode, said first signal being generated when said playback signal is switched off by said switching means;

second circuit means coupled to said first circuit means for generating responsive to said first signal a second signal having said predetermined period, said second signal being provided directly to the mode control circuit of the tape recorder to actuate the rewind mode and effect a back space operation of the tape recorder; and third circuit means coupled to said first circuit means for generating responsive to said first signal a third signal when the specific duration of said first signal elapses, said third signal being provided to the mode control circuit of the tape recorder to actuate the stop mode and stop said back space operation of the tape recorder; and means coupled to said switching means and adapted to be coupled to the mode selecting means of the tape recorder, for preventing actuation of the rewind mode by said back spacing means while the playback mode is selected by the mode selecting means;

a foot switch housing which encloses said switching means and said back spacing means; and coupling means attached to said foot switch housing for detachably coupling said switching means and said back spacing means to the tape recorder so that said playback switch and said back spacing means are connected to the mode control circuit of the tape recorder through said coupling means.

2. A foot switch apparatus for an electronically controlled tape recorder which does not per se include an automatic back space operation mode, said tape recorder having a mode control circuit which controls playback, stop, recording and rewind operation modes of the tape recorder, and mode selecting means for selecting one of the operation modes including the playback mode, said foot switch apparatus being external of the tape recorder and comprising:

switching means adapted to be coupled to the mode control circuit of the tape recorder, for specifying at least a playback mode and a stop mode of the tape recorder in response to a foot pressure applied selectively on the foot switch apparatus;

said switching means includes a playback switch for switching a playback signal to be applied to the mode control circuit, said playback switch specifying said playback mode when switching said playback signal on and specifying said stop mode after switching said playback signal off;

a recording switch adapted to be coupled to said mode control circuit and coupled to said playback switch, and a mode change switch adapted to be coupled to said mode control circuit and coupled to said recording switch and which selectively controls said recording switch for designating whether said recording mode or said rewind mode is to be performed;

back spacing means coupled to said playback switch, for actuating the rewind mode of the mode control circuit for a predetermined period of time in response to switching off said playback signal by said playback switch, and for effecting the stop mode after said predetermined period;

said back spacing means including:

first circuit means coupled to said playback switch for generating a first signal having a duration of time corresponding to the predetermined period of said rewind mode, said first signal being generated when said playback signal is switched off by said switching means;

second circuit means coupled to said first circuit means for generating responsive to said first signal a second signal having said predetermined period, said secons signal being provided directly to the mode control circuit of the tape recorder to actuate the rewind mode and effect a back space operation of the tape recorder; and third circuit means coupled to said first circuit means for generating responsive to said first signal a third signal when the specific duration of said first signal elapses, said third signal being provided to the mode control circuit of the tape recorder to actuate the stop mode and stop said back space operation of the tape recorder; and means coupled to said switching means and adapted to be coupled to the mode selecting means of the tape recorder, for preventing actuation of the rewind mode by said back spacing means while the playback mode is selected by the mode selecting means;

a foot switch housing which encloses said switching means and said back spacing means; and coupling means attached to said foot switch housing for detachably coupling said switching means and said back spacing means to the tape recorder so that said switching means and said back spacing means are connected to the mode control circuit of the tape recorder through said coupling means.

3. A foot switch apparatus for an electronically controlled tape recorder which does not per se include an automatic back space operation mode, said tape recorder having a mode control circuit which controls playback, stop, fast forward, recording and rewind operation modes of the tape recorder, and mode selecting means for selecting one of the operation modes including the playback mode, said foot switch apparatus being external of the tape recorder and comprising:

switching means adapted to be coupled to the mode control circuit of the tape recorder, for specifying at at least a playback mode and a stop mode of the tape recorder in response to a foot pressure applied selectively on the foot switch apparatus;

said switching means includes a playback switch for switching a playback signal to be applied to the mode control circuit, said playback switch specifying said playback mode when switching said playback signal on and specifying said stop mode after switching said playback signal off;

a recording switch adapted to be coupled to said mode control circuit and said playback switch, and a mode change switch adapted to be coupled to said mode control circuit and coupled to said recording switch and which selectively controls said recording switch for designating whether said recording mode or said fast forward mode is to be performed;

back spacing means coupled to said playback switch, for actuating the rewind mode of the mode control circuit for a predetermined period of time in response to switching off said playback signal by said playback switch, and for effecting the stop mode after said predetermined period;

said back spacing means including:

first circuit means coupled to said playback switch for generating a first signal having a duration of time corresponding to the predetermined period of said rewind mode, said first signal being generated when said playback signal is switiched off by said switching means;

second circuit means coupled to said first circuit means for generating responsive to said first signal a second signal having said predetermined period, said second signal being provided directly to the mode control circuit of the tape recorder to actuate the rewind mode and effect a back space operation of the tape recorder; and third circuit means coupled to said first circuit means for generating responsive to said first signal a third signal when the specific duration of said first signal elapses, said third signal being provided to the mode control circuit of the tape recorder to actuate the stop mode and stop said back space operation of the tape recorder; and means coupled to said switching means and adapted to be coupled to the mode selecting means of the tape recorder, for preventing actuation of the rewind mode by said back spacing means while the playback mode is selected by the mode selecting means;

a foot switch housing which encloses said switching means and said back spacing means; and coupling means attached to said foot switch housing for detachably coupling said switching means and said back spacing means to the tape recorder so that said switching means and said back spacing means are connected to the mode control circuit of the tape recorder through said coupling means.

4. A foot switch apparatus for an electronically controlled tape recorder which does not per se include an automatic back space operation mode, the tape recorder being provided with a mode control circuit having control input terminals for at least playback, stop and rewind operation modes of the tape recorder, and mode selection switches coupled to the control input terminals for selecting each of the playback, stop and rewind operation modes; said foot switch apparatus being external to the tape recorder and comprising:

switch means adapted to be coupled to the playback operation mode control input terminal and the stop operation mode control input terminal of the mode control circuit, and responsive to pressure selectively applied by a foot switch operator, for switching to the playback operation mode control input terminal a playback signal when said pressure is applied, and for switching to the stop operation mode control input terminal a stop signal after said pressure is removed;

back spacing means coupled to said switch means and adapted to be coupled to the rewind operation mode control input terminal of the mode control circuit, for generating a back spacing signal for a given period of time after said pressure is removed, so that the tape recorder performs a rewind operation according to said back spacing signal during said given period of time, and for preventing actuation of the stop mode of the tape recorder during said given period of time; and prohibiting means adapted to be coupled to the playback operation mode control input terminal of the mode control circuit and coupled to said back spacing means, for prohibiting operation of said back spacing means from generating said back spacing signal while the mode selection switches on the tape recorder are set to select the playback operation mode;

wherein said prohibiting means includes:

diode means arranged to be connected between the playback operation mode control input terminal of the mode control circuit and a node in said back spacing means, for allowing a voltage potential to develop at said node to produce said back spacing signal when said switch means of the foot switch apparatus is used for switching of said playback signal, and for preventing said voltage potential from developing when the mode selection switches of the tape recorder are operated to select the playback operation mode.

5. A foot switch apparatus of claim 1, 2 or 3, wherein said coupling means includes:

a plug which has electrical contacts and which is mechanically detachably connected to a receptacle mounted to said tape recorder, a cable which connects said plug and said foot switch housing and which couples said switching means and said back spacing means to said electrical contacts of said plug, and clamp means mounted to said cable for preventing physical movement of said foot switch housing from being transmitted to said tape recorder.

6. A foot switch apparatus of claim 2, wherein said switching means further includes a rewind switch which is connected to said mode control circuit and said playback switch and which designates said rewind mode for said mode control circuit, said playback switch and said recording switch being inactive when said rewind switch designates said rewind mode.

7. A foot switch apparatus of claim 3, wherein said mode control circuit has a function of designating a rewind mode for said tape recorder; and
said switching means further includes:
a rewind switch which is coupled to said mode control circuit and said playback switch and which designates said rewind mode for said mode control circuit, said playback switch and said recording switch being inactive when said rewind switch designates said rewind mode.

* * * * *